July 31, 1962 G. ROSIER 3,047,735

PULSE WIDTH DISCRIMINATOR EMPLOYING A TRANSISTOR WHEREIN THE BIAS IS CONTROLLLED BY AN INTEGRATING CIRCUIT

Filed Oct. 31, 1957

INVENTOR
GERARDUS ROSIER

BY Frank R. Jifari
AGENT

United States Patent Office 3,047,735
Patented July 31, 1962

3,047,735

PULSE WIDTH DISCRIMINATOR EMPLOYING A TRANSISTOR WHEREIN THE BIAS IS CONTROLLED BY AN INTEGRATING CIRCUIT

Gerardus Rosier, Hilversum, Netherlands, assignor to North American Philips Company, Inc., New York, N.Y., a corporation of Delaware Filed Oct. 31, 1957, Ser. No. 693,573
Claims priority, application Germany Nov. 3, 1956
3 Claims. (Cl. 307—88.5)

In pulse systems, for example for interpreting television synchronizing pulses, it is frequently desirable for pulses having a given repetition period to be distinguished from other pulses which are transmitted through the same channel. To this end, use is made either of tuned resonant circuits or, more particularly in the case of a comparatively large difference between the repetition periods of the pulses to be transmitted and of the pulses not to be transmitted, for example in television, of so-called integrating circuits. These circuits usually comprise resistors, capacitors and rectifiers, and they pass comparatively slow pulses, whereas short pulses set up in rapid success are integrated and are not transmitted as separate pulses. By means of this "integration," a voltage can be produced which may be used as a control voltage, for example as a bias voltage for a valve amplifier stage.

It is an object of the present invention to provide a selective circuit arrangement of the above-mentioned kind, which is comparatively simple and includes a transistor, the particular properties of which permit a satisfactory separation of the desired pulses from other pulses not to be transmitted even when the difference between the respective ratios of pulse duration to time interval between adjacent pulses is comparatively small.

The selective circuit arrangement in accordance with the invention responds to the ratio of the pulse duration to the time interval between adjacent pulses, so that it is capable, for example, of transmitting a single pulse of given duration and of not transmitting a train of pulses of the same duration, or conversely. The circuit arrangement includes at least one transistor, to the base of which the pulses are applied, and it is characterized in that the emitter circuit of the transistor includes an inductance which, together with the impedance of the collector-emitter circuit of the transistor forms an integrating network, the time constant of which exceeds the pulse repetition period of any pulses to be interpreted, a reverse bias voltage being applied between the base and the emitter of the transistor, so that in dependence on the above-mentioned ratio, the transistor which is cut off during the pulse intervals by the said bias, is also substantially cut off during the pulses by the integrated voltage produced across the inductance.

Figure 1:
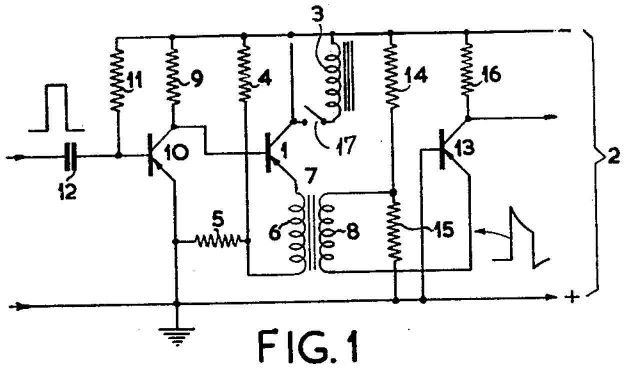
Figure 2:
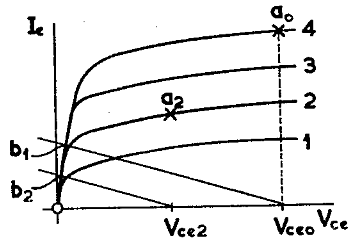
Figure 3:
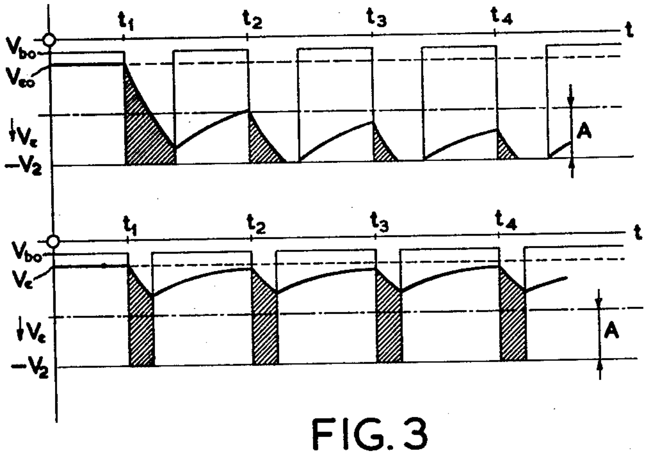

In order that the invention may readily be carried out, one embodiment and a modification thereof will now be described, by way of example, with reference to the accompanying diagrammatic drawings, in which FIG. 1 is a circuit diagram of the said embodiment also showing the said modification, while FIGURES 2 and 3 are diagrams illustrating the operation of the circuit arrangements shown in FIG. 1.

The embodiment shown includes a transistor 1, for example a junction transistor of the pnp-conductivity type, in common-collector connection. As will be seen from the figure, the collector of this transistor is directly connected to the negative terminal of a voltage supply source 2; however, it may alternatively be supplied from this source through a resistance or an impedance, for example, through an inductor 3. A small negative voltage $V_{eo}$ (FIG. 3) of, say 0.5 v. is supplied to the emitter of transistor 1 by means of a voltage divider comprising resistors 4 and 5. Between the emitter and the tapping on the voltage divider 4—5 is connected an inductance 6 formed by the primary winding of a transformer 7. The base of the transistor 1 is connected to the negative terminal of the source 2 through a resistor 9 which is connected in the collector circuit of a second transistor 10 and forms the load impedance of this transistor. The emitter of the transistor 10 is directly connected to the positive terminal of the source 2 and to earth, the base of this transistor being connected, through a resistor 11, to the negative terminal of this source and, through a coupling capacitor 12, to a pulse generator. The secondary winding 8 of the transformer 7 is connected to the input terminals of a device having a sensitivity threshold.

In the embodiment shown in FIG. 1, this device is a transistor amplifier stage comprising a transistor 13. The base of this transistor is earthed and its emitter is connected, through the secondary winding 8, to a tapping on a voltage divider 14—15, which maintains the transistor cut off for input signals having an amplitude smaller than a predetermined value. The collector of the transistor 13 is connected, through a load resistor 16 to the negative terminal of the source 2, the output pulses being produced across this resistor. The input circuit of the transistor 13 may alternatively be capacitively coupled to the collector-emitter circuit of the transistor 1, for example to the emitter thereof. In this event, the coupling capacitor should preferably have a capacitance of so small a value that the capacitor together with a bias resistor for the input electrode of the transistor 13 form a network, the time constant of which is materially less than the duration of the pulses to be transmitted. Thus, this network will differentiate the current pulses produced in the emitter circuit of the transistor 1, similarly to the transformer 7.

When no pulses or other signals are supplied to the base of the transistor 10, this transistor is conductive, so that the base of the transistor 1 is earthed through the collector-emitter path of the transistor 10. Consequently, the transistor 1 is cut off by the negative voltage applied to its emitter.

When a positive pulse arrives at the base of the transistor 10 through the capacitor 12, this transistor is cut off by this pulse, so that the base of the transistor 1 is now negatively biased through the resistor 9. The resistor 9 then passes a base current $I_b$ which is substantially determined by the potential of the emitter of the transistor 1 with respect to the negative terminal of the source 2 and by the value of the resistor 9. As a result, an emitter current $$I_e \simeq \frac{1}{1-\alpha} I_b$$

flows through the primary winding 6 of the transformer 7 and induces an output voltage pulse across the secondary 8 thereof.

Owing to the voltage drop across the primary 6, the voltage $V_{ce}$ applied between collector and emitter of the transistor 1 is reduced, so that the emitter current $I_e$ of this transistor is also reduced, the working point being shifted, for example, from a point $a_0$ on the emitter current voltage characteristic 4 of FIG. 2 to a point $b_1$. The shape of the output voltage pulse is correspondingly changed to the form indicated at the right-hand side of FIG. 1.

If a train of positive-going pulses are supplied to the base of the transistor 10, the second of these pulses, which is amplified and inverted by this transistor, reaches the base of the transistor 1 at an instant $t_2$ (FIG. 3) at which the potential of the emitter of this transistor has not recovered its original value $V_{eo}$, which is determined by the voltage divider 4—5. Owing to the presence of the time-constant network comprising the inductance of the primary winding 6 and the impedance in the collector-emitter circuit of the transistor 1, the current through this winding decreases comparatively slowly. The said impedance is determined by the resistance $R_s$ of the voltage divider 4—5, the impedance of the source 2, the ohmic resistance $R_2$ of the winding 6 and the output or emitter resistance $R_e$ of the transistor 1 (in grounded collector connection) and this impedance R and the inductance L of the primary 6 are chosen such that the time constant $L/R$ exceeds the time interval $t_2—t_1$ (FIG. 3) between two adjacent pulses of the pulse train.

The upper part of FIG. 3 shows a train of comparatively broad negative-going square-wave pulses of amplitude $—V_2—V_{bo}$, which are supplied to the base of the transistor 1. The heavily drawn line represents the potential of the emitter and the shaded portions of the pulses are the portions during which a "charging" current pulse flows through the winding 6 and produces a corresponding voltage pulse across the secondary 8. During the pulses, the transformer 7 supplies the emitter current of the transistor 13, so that the transformer is loaded and the effective value of the inductance of its primary is reduced. As a result, the emitter potential $V_e$ decreases more rapidly and increases more slowly between the control pulses. As will be seen from the drawing, the amplitude of the current pulses decreases comparatively rapidly to a value smaller than the value A, which corresponds to the sensitivity threshold of the device following the transistor 1. Thus, the transistor 1, which normally is cut off by its emitter bias, is gradually also substantially cut off during the control pulses. Only the first control pulses of the pulse train are transmitted.

The lower part of FIG. 3 shows the conditions obtaining with shorter control pulses of the same repetition period $t_2—t_1$. As will be seen, the amplitude of the emitter current pulses remains larger than the value A corresponding to the sensitivity threshold: All the control pulses of the pulse train are transmitted.

The selectivity can be increased by means of a collector impedance. In FIG. 1, an inductor 3 may be connected in the collector circuit of the transistor 1 by means of switch 17. The impedance of this inductor causes the collector-emitter voltage $V_{ce}$ of the transistor 1 to be greatly reduced in accordance with the collector current of this transistor. Consequently, in the characteristic shown in FIG. 2, the working plant of the transistor 1 is not shifted from a point $a_0$ to a point $b_1$, but is situated from the outset substantially at point $b_1$, which lies on a load line passing through this point $b_1$ and a point $V_{ceo}—0$. At the beginning of the second pulse, the remaining collector-emitter voltage is only $V_{ce_2}$ so that the load line is shifted to the left and the working point is situated by $b_2$. It will be appreciated that the transistor 1 is cut off more rapidly and more effectively due to the presence of the impedance 3, so that the occurrence of very short emitter current pulses which might exceed the value A corresponding to the sensitivity threshold for a number of periods is prevented.

Thus, with a given repetition period of the pulses of a pulse train, the transmission of these pulses by the circuit arrangement described is dependent upon the ratio of the pulse duration to the repetition period. If only such pulse trains are to be transmitted for which this ratio lies between two fixed limits, pulses of a too short duration can be eliminated by means of a second circuit arrangement connected in cascade with the first circuit arrangement, the base of the transistor of the second circuit arrangement corresponding to the transistor 1 of the first circuit arrangement being driven negative during the pulse intervals. Obviously, this second circuit arrangement must be proportioned and adjusted so that it transmits pulses of a duration slightly exceeding that of the pulses transmitted by the first circuit arrangement, since otherwise the transmission of all pulse trains the repetition periods of which are small compared with the time constant or constants of the two circuit arrangements would be prevented. For example, with identical initial operating points for the two circuit arrangements, the time constants may be chosen different. Conversely, with equal time constants, the emitter and/or base bias voltages and, if desired, the collector bias voltages may be chosen different. It is furthermore possible to select different sensitivity thresholds for the devices connected to the respective outputs of the successive circuit arrangements.

What is claimed is:

1. A selective circuit arrangement for discriminating between a first series of pulses and a second series of pulses, said first series having a ratio of pulse duration to pulse interval larger than a predetermined value and said second series having said ratio less than said predetermined value, said circuit comprising at least one transistor having a base electrode, an emitter electrode and a collector electrode, means for applying input pulses between said base electrode and a point of constant potential, bias voltage means comprising a voltage divider connected between said base and emitter electrodes, said bias voltage means having a polarity and magnitude to cut off said transistor during a pulse interval, an inductance included in the emitter-collector circuit of said transistor, said inductance forming an integrating network with the impedance of the collector-emitter circuit of the transistor and said voltage divider, said inductance, said impedance and the resistance of said voltage divider having a value such that the time constant of said integrating network is greater than the repetition period of any of said series of pulses, the integrated voltage set up across said inductance acting to control the conductivity of said transistor in response to said ratio of pulse duration to pulse interval, and a threshold device having input and output terminals, means for deriving pulses from the collector-emitter circuit of the transistor and for applying them to the input terminals of said threshold device, said derived pulses having an amplitude varying with said integrated voltage, said threshold device blocking the transmission of derived pulses having an amplitude smaller than a predetermined value.

2. A circuit arrangement as claimed in claim 1 wherein the circuit of said collector electrode includes an impedance having a value such that the amplitude of the emitter current has an upper value due to collector limiting.

3. A circuit arrangement according to claim 2, wherein said impedance is substantially inductive.

References Cited in the file of this patent

UNITED STATES PATENTS

| | | |
|---|---|---|
| 2,811,590 | Doremus et al. | Oct. 29, 1957 |
| 2,866,925 | Wunderman | Dec. 30, 1958 |
| 2,885,572 | Felker | May 5, 1959 |
| 2,939,968 | Drubin | June 7, 1960 |
| 2,941,091 | Schneider | June 14, 1960 |

FOREIGN PATENTS

| | | |
|---|---|---|
| 770,068 | Great Britain | Mar. 13, 1957 |